(12) United States Patent
Bick et al.

(10) Patent No.: US 6,341,661 B1
(45) Date of Patent: Jan. 29, 2002

(54) BOW DOME SONAR

(75) Inventors: Ernest Theodore Bick, Newhall; Merrill E. Fife, Canyon Country; Scott A. Hudson, Stevenson Ranch, all of CA (US)

(73) Assignee: L3 Communications Corporation, Sylmar, CA (US)

( * ) Notice: Subject to any disclaimer, the term of this patent is extended or adjusted under 35 U.S.C. 154(b) by 0 days.

(21) Appl. No.: 09/573,520

(22) Filed: May 17, 2000

Related U.S. Application Data

(60) Provisional application No. 60/199,007, filed on Apr. 19, 2000.

(51) Int. Cl.$^7$ .................................................. G01V 1/00
(52) U.S. Cl. ........................ 181/110; 181/111; 181/112; 181/139; 181/140
(58) Field of Search ............................... 181/110, 111, 181/112, 120, 123, 124, 125, 139, 140, 141

(56) References Cited

U.S. PATENT DOCUMENTS

| | | | |
|---|---|---|---|
| 4,641,290 A | * 2/1987 | Massa et al. | 367/106 |
| 4,709,361 A | 11/1987 | Dahlstrom et al. | 367/165 |
| 4,997,705 A | 3/1991 | Caprette, Jr. et al. | 428/302 |
| 5,239,518 A | 8/1993 | Kazmar | 367/157 |
| 5,400,300 A | 3/1995 | Bick et al. | 367/99 |
| 5,497,357 A | 3/1996 | Dahlstrom et al. | 367/158 |
| 5,719,824 A | 2/1998 | Boucher | 367/176 |
| 6,233,202 B1 | * 5/2001 | McDonald et al. | 367/5 |

FOREIGN PATENT DOCUMENTS

GB 2093996 * 9/1982

* cited by examiner

*Primary Examiner*—Shih-Yung Hsieh
(74) *Attorney, Agent, or Firm*—Roberts & Mercanti, LLP

(57) ABSTRACT

A compact, modular sonar assembly for use on the bow of a ship having separate transmitting and receive arrays confined within a single acoustic housing. The narrow and compact design fits much better into the hydrodynamically desirable bulbous bow deign than the typical bow dome sonar design and achieves good performance at a low cost with reduced size and weight.

26 Claims, 4 Drawing Sheets

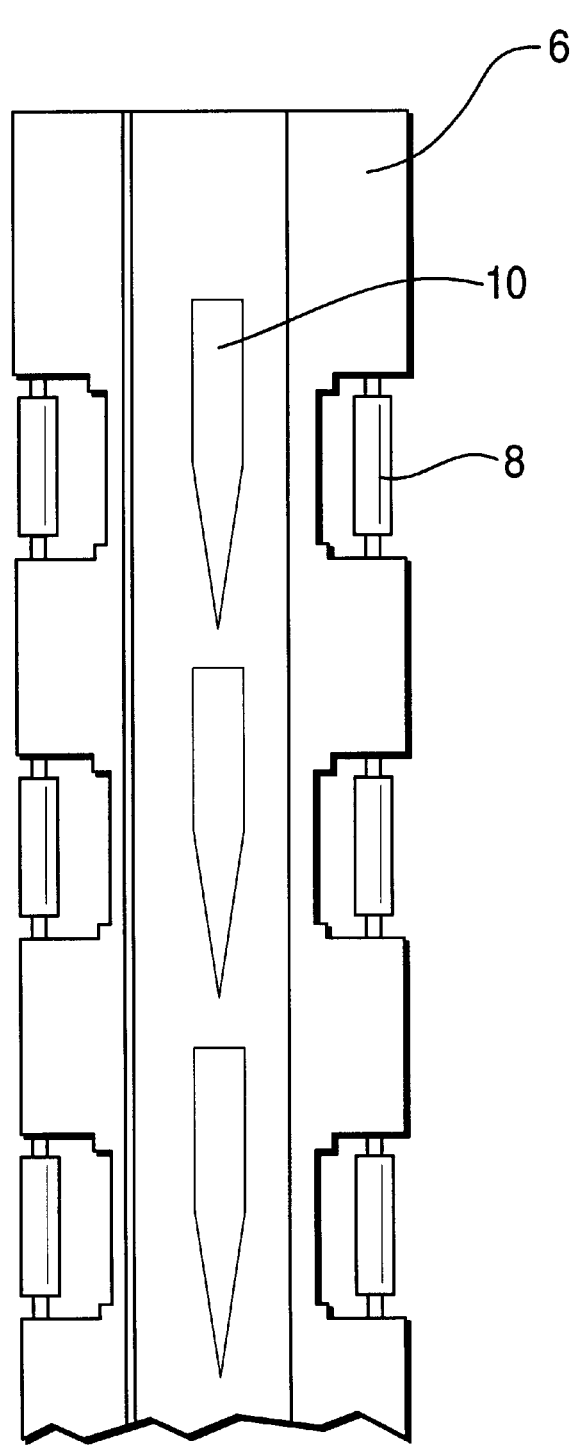
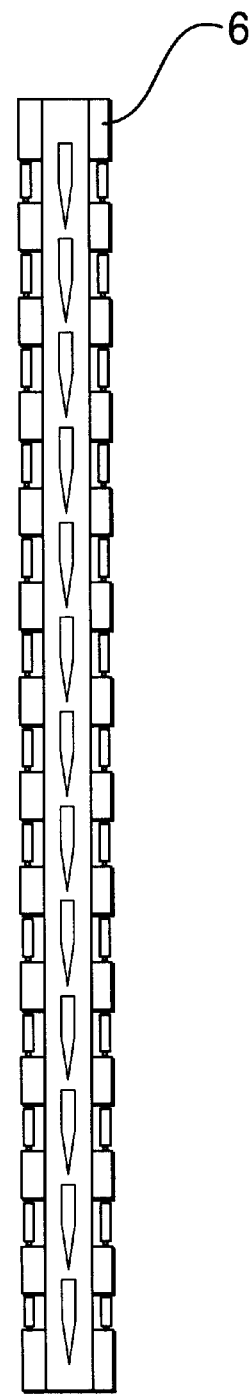
FIG. 2
FIG. 3

BOW DOME SONAR

CROSS REFERENCE TO RELATED APPLICATION

Applicant hereby claims the benefit of provisional patent application No. 60/199,007 filed Apr. 19, 2000 which is incorporated herein by reference.

BACKGROUND OF THE INVENTION

1. Field of the Invention

The present invention relates to a sonar sensor for the underwater detection of submarines and other underwater obstacles. More specifically, the invention relates to a compact, modular sonar for use on the bow of a ship or submarine utilizing flextensional or other compact transducers with high power density, and a separate light-weight receive sensors having good performance, low cost and reduced size and weight compared to other bow mounted long range sonar systems.

2. Description of the Related Art

As is well known in the art, sonars on-board ships and submarines are useful for the detection of submarines and other underwater obstacles. One particular type of such a sonar is mounted in a ship's or submarine's bow dome. In general, a bow dome sonar array is a sonar sensor that is mounted on the hull of a ship or submarine and protected by an acoustically transparent window or ellipsoidal dome. See, for example, U.S. Pat. No. 5,400,300 which generally describes a sonar system mounted underwater on the hull of a ship. See also U.S. Pat. No. 5,719,824 which generally describes an underwater domed sonar assembly.

Within the acoustic window of a bow dome sonar assembly are sound wave projecting and receiving transducers. In the field of sonar, projecting transducers generally are used to project an acoustic output signal into a body of water in response to an input electrical signal. Receiving transducers generally are used to receive acoustic waves reflected back to the sonar assembly and generate an output signal in response the reflected acoustic energy.

Prior art bow dome sonars have been known to use a single transducer array for performing both the transmit function and the receive function as described above. A major problem associated with long range (30–40 nautical miles) sonar assemblies of this type is the size and weight of the assembly. The transition of the transducers from the transmit function to the receive function requires a complex switching network that is housed in the ship or submarine. This adds to the cost and weight of the sonar. Also, transporting such enormous assemblies at the bow of a ship decreases the fuel efficiency and operational speed of the ship.

It is an object of this invention to provide a bow dome long range sonar assembly having separate transducer arrays for both the projecting and receiving functions as an alternative to the dual function transducers of the prior art. In such an arrangement, each of the separate arrays are positioned within the acoustic window. Having separate transmit and receive arrays allows for a lighter and more compact bow dome sonar assembly than known from the prior art.

Further, the size of typical prior art long range sonar assemblies for surface ships are so large that they impact the ships hull design required to house them. This decreases the ships range and its operational speed. Also, the extremely heavy (e.g., 30–40 tons), prior art bow dome sonar assemblies require large amounts of energy to drag them through a body of water. The large size and heavy weight of this assembly adversely affects the ship's hydrodynamics and causes increased drag and a decrease in fuel efficiency.

It is an object of this invention to provide a bow dome sonar assembly that will give similar high performance as prior art designs in a much smaller package at considerable savings in weight and cost. This design, having separate transmitting and receive arrays, is a narrower and more compact bow dome design than the prior art. Further, it fits much better into the hydrodynamically desirable bulbous bow design which is narrower and taller in shape as compared to a typical sonar bow dome design. This design also eliminates the need for a complex switching network, and receive cabinets, and allows the use of imbedded towed array telemetry because separate transducers are used for the transmit and receive function. Also, the volumetric design of the receive array forms its own virtual baffle and discriminates against reflections from the ship's or submarine's structure.

SUMMARY OF THE INVENTION

The invention provides a sonar assembly comprising:
a) an elongated array of sequentially juxtaposed transmitting transducer elements stacked within and confined by a pressure housing, each transducer being independently connected to drive circuitry;
b) opposite ends of the pressure housing being attached internally to first and second portions of a frame, which frame is mountable on a ship or submarine;
c) a plurality of staves sequentially positioned around a periphery of the frame, each stave extending between the first and second portions of the frame;
d) a series of acoustic receive hydrophones positioned along each stave, each hydrophone being independently connected to signal detecting circuitry; and
e) an acoustically transparent housing encapsulating the frame.

The invention also provides a bow dome sonar assembly for connection to the bow of a ship or submarine comprising:
a) an elongated array of sequentially juxtaposed transmitting transducer elements stacked within and confined by a pressure housing, each transducer being independently connected to drive circuitry;
b) opposite ends of the pressure housing being attached internally to first and second portions of a frame, which frame is mountable on a ship or submarine;
c) a plurality of staves sequentially positioned around a periphery of the frame, each stave extending between the first and second portions of the frame;
d) a series of acoustic receive hydrophones positioned along each stave, each hydrophone being independently connected to signal detecting circuitry; and
e) an acoustically transparent housing encapsulating the frame.

The invention further provides a process for detecting underwater objects comprising:
a) providing a sonar assembly comprising:
   i) an elongated array of sequentially juxtaposed transmitting transducer elements stacked within and confined by a pressure housing, each transducer being independently connected to drive circuitry;
   ii) opposite ends of the pressure housing being attached internally to first and second portions of a frame, which frame is mountable on a ship or submarine;
   iii) a plurality of staves sequentially positioned around a periphery of the frame, each stave extending between the first and second portions of the frame;

iv) a series of acoustic receive hydrophones positioned along each stave, each hydrophone being independently connected to signal detecting circuitry; and v) an acoustically transparent housing encapsulating the frame;

b) transmitting an acoustic signal from a plurality of transmitting transducer elements into a fluid medium;

c) receiving a reflected acoustic signal via the acoustic receive hydrophones;

d) sampling analog signals received by the hydrophones via sampling means; and e) generating a digital signal from the analog signals.

BRIEF DESCRIPTION OF THE DRAWINGS

FIG. 2 is an elevational view of a section of a stave along with its hydrophones and dual acoustic modules.

FIG. 3 is an elevational view of one stave.

DETAILED DESCRIPTION OF THE PREFERRED EMBODIMENTS

Figure 1:
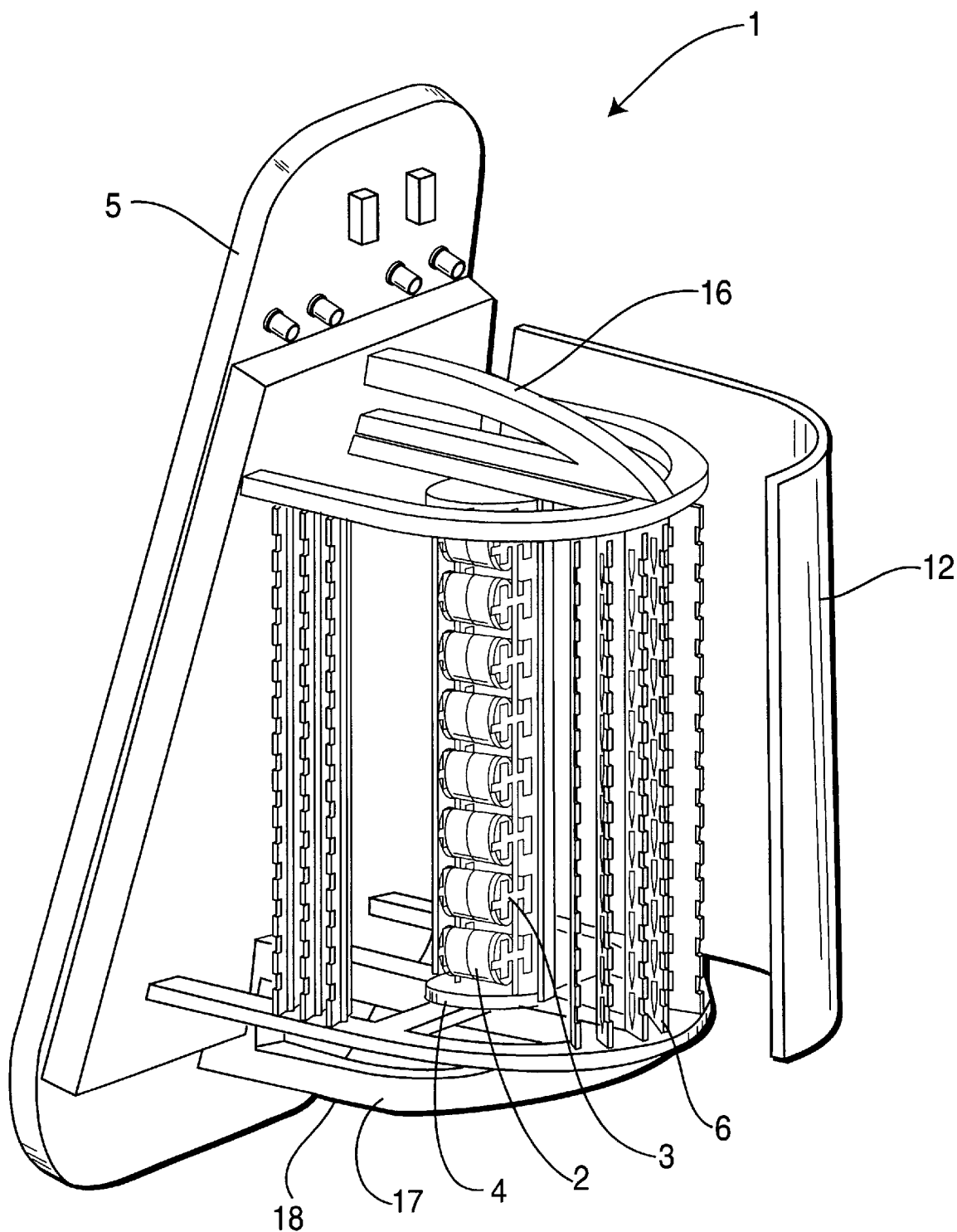
FIG. 1 is a perspective view of the bow dome sonar assembly having separate transmitting and receiving arrays.

The invention provides a compact bow dome long range sonar assembly having separate transmitting and receive transducer arrays positioned within an acoustic housing. Shown in FIG. 1 is a perspective view of a bow dome sonar assembly 1 according to the invention. As shown, the assembly 1 comprises an elongated array 3 of sequentially juxtaposed transmitting transducer elements 2 stacked within and confined by an enclosed, preferably cylindrical pressure housing 4, which is cut-away in this view. Each transducer is independently connected to drive circuitry so that their acoustic projections may be individually controlled. Opposite ends of the pressure housing 4 are attached internally to top and bottom portions of a frame 17 which is mountable on a ship's bow 5. Within the context of this invention, a ship includes a submarine. A plurality of staves 6 are sequentially positioned around a periphery of the frame 17 such that each stave extends between a top of the frame 16 and a bottom of the frame 18. A series of acoustic receive hydrophones 8 are positioned along each stave 6 wherein each hydrophone 8 is independently connected to signal detecting circuitry. An acoustically transparent housing 12 then encapsulates the frame.

There are various types of transmitting transducers known in the art. Commonly used transducers include flextensional transducers, flexural disk transducers, slotted cylinder transducers, split bias transducers and the like. All of these, and potentially others as well are suitable for application to this invention. Transducers which are most suitable for use in this invention use high power density transduction material. As used in this invention, the term high power density means the combination of the transduction material and the vibrating unit produces high acoustic intensity where acoustic intensity is the average rate of flow of energy through a unit area normal to the transducer radiating surface e.g. Joules per second per square meter or watts per square meter. Preferably the transducers of this invention have an acoustic intensity of about 1200 watts/m$^2$ or more. See, for example, U.S. Pat. No. 5,239,518 which describes a high power density transducer drive material.

U.S. Pat. No. 4,709,361 describes slotted cylinder transducers and U.S. patent application Ser. No. 09/276,030 describes split bias transducers. In the most preferred embodiment of the invention, the transducer elements comprise flextensional transducers. These are generally described in U.S. Pat. Nos. 5,497,357 and 5,239,518. All of the above patents and applications incorporated herein by reference.

Figure 5:
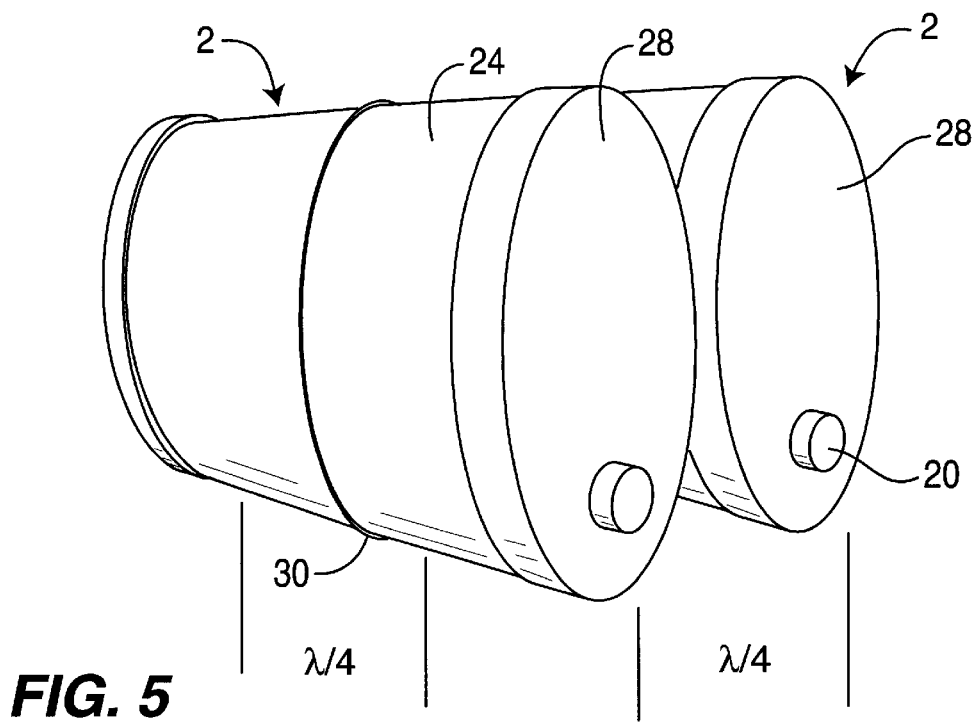
FIG. 5 is an elevational view of two adjacent pairs of transmitting transducers.
Figure 6:
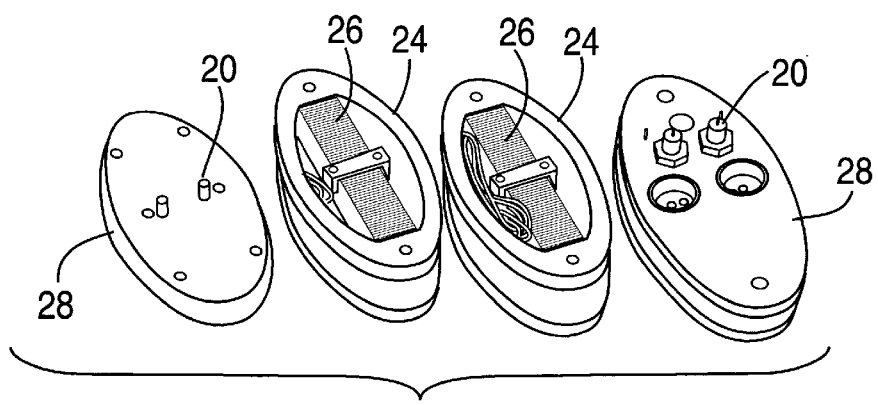
FIG. 6 is a perspective view of two separated transmitting flextensional transducer elements with endcaps removed.
Figure 7:
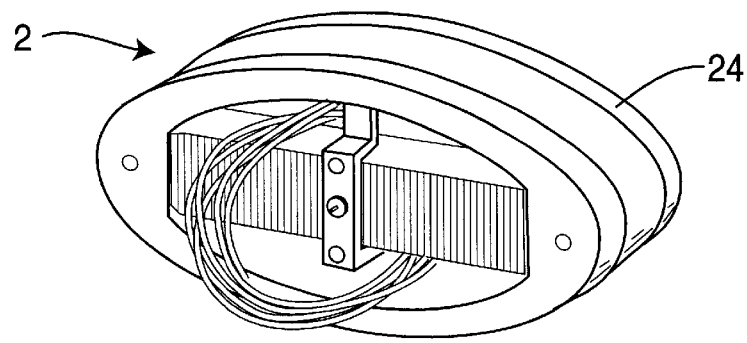
FIG. 7 is a perspective view of a flextensional transducer element.

In the preferred embodiment, the elongated array 3 comprises sequentially juxtaposed transmitting transducer elements 2 arranged in mating pairs. Groupings of two mating pairs then form a transducer module. Shown in FIG. 7 is a perspective view of a flextensional transducer element 2 useful for the invention. The flextensional transducer element comprises a hollow shell 24 having concave or convex side walls meeting at opposing ends. The walls and ends delineate opposing open sides and contain a ceramic stack 26 positioned in the hollow shell which extends between the opposing ends. This high power density ceramic stack 26 is adapted to exert a force on the opposing ends and strain the concave or convex side walls when the stack is subjected to sufficient driving voltage through electrodes bonded to the stack. FIG. 6 shows a pair of transducer elements in disassembled form. Shown are two open hollow shells 24, each containing a high power density ceramic stack 26. Each shell is then covered by an endcap 28. Electrodes 20 (housed within waterproof connectors) which extend through the cap electrically connect to the ceramic stack. Referring to FIG. 5, in the preferred embodiment, each individual transducer element 2 is attached to a mating transducer element 2 by means of an intermediate elastomeric seal 30 thus forming an attached pair of transducer elements in the form of a hollow oval cylinder or shell. The seal 30 is attached to an open side of each transducer element. Alternatively 30 may be a spacer, such as a metal spacer, between the shells 24 and the spacer and shells may be encircled by a sealing cover or boot. Opposite open sides of each pair of mating transducer elements 2 are closed by an endcap 28 thus forming a hollow oval container. When two transducer pairs are positioned together side by side, they form a transducer module as shown. In the preferred embodiment, eight modules are employed, although the number may be greater or lesser. Each of the individual transducers 2 are independently connected to drive circuitry by accompanying electrodes 20 suitable to provide the requisite signals to the transducer from an on-board ship signal generator, not shown. The high power density ceramic stacks are positioned such that the stack of one transducer element is parallel to the stack of the mating transducer element.

Each transducer element is preferably separated from its mating transducer element by a distance of about ¼ wavelength at the center of the operating frequency band of the sonar assembly. Each transducer pair of each module is separated from its corresponding transducer pair of a given module by a distance of about ¼ wavelength at the center of the operating frequency band of the sonar assembly. Each module of the stacked array is separated from an adjacent module of the stacked array by a distance of about ½ wavelength at the center of the operating frequency band of the sonar assembly. These separation distances between transducers allow for a phase delay and horizontal and vertical steering in the transmission of an acoustic signal into a fluid medium.

The transducers are preferably constructed to provide a compressive load on the ceramic which is sufficient to compensate for any tensile stresses induced by hydrostatic load or dynamic drive conditions. Many different types of flextensional transducers are known differing in shell shape and symmetry Low frequency transducers are preferred. Lower resonant frequencies are achieved by utilizing larger and/or thinner walled shells generally leading to larger transducers. The low frequency transducers exhibits low attenuation of the acoustic signals in sea water and are used when it is required that transducer have a higher power output. Preferably the transmitting transducers have a resonant frequency in the range of from about 1000 HZ to about 10000 Hz. The high acoustic power outputs and low resonant frequencies increase the range and hence, the utility of the transducer. Flextensional transducers are preferred since they have wider bandwidths, are compact at lower operating frequencies, and higher power handling capabilities than other types of transducers of comparable size and weight. One preferred flextensional transducer (the "Class IV flextensional transducer") includes a cylindrical or rectangular ceramic driver mounted within and along the major axis of an elliptically shaped shell.

Each high power density ceramic stack 26 comprises a number of ceramic plates between which are sandwiched metal electrodes, these in turn being connected in parallel. Each stack element is flat and preferably rectangular or circular and may range from about 0.5 inch to about 6 inches in length and width and from about 0.005 to about 0.5 inch in thickness. The total stack has a length which fits in the shell 24. Each stack element is attached to the next stack element as well as to the end elements by a suitable adhesive such as an epoxy which will not lose its adhesion during transducer operating conditions. The stack may operate at room temperature, below room temperature or above room temperature. The preferred operating temperature to achieve high power over continuous operation may range from about 10° C. to about 130° C., more preferably from about 20° C. to about 100° C. and most preferably from about 20 C. to about 90° C. The stack can be heated by rod heaters or blanket heaters attached either directly to the stack elements or to the shells.

The ceramic stacks comprise any suitable ceramic crystalline material such as electrostrictive, piezoelectric or magnetostrictive materials. If the ceramic crystal is subjected to a high direct current voltage during the manufacturing process, the ceramic crystal becomes permanently polarized and operates in the piezoelectric region. The electrical signal is then applied to the ceramic stack to generate mechanical vibrations. As an alternative, direct current voltage can be temporarily applied to the ceramic stack during operation to provide polarization of the crystal. Under these conditions, the operation of the projector is in the electrostrictive region. After the application of the direct current voltage is discontinued, the ceramic stack is no longer polarized. Of the two, piezoelectric ceramic stacks are more commonly used.

Preferred electrostrictives include lead magnesium niobates (PMN), lead magnesium niobate-lead titanate (PMN-PT), lead magnesium niobate-lead titanate-barium titanate (PMN-PT-BA), lead zirconate niobate (PZN), lead zirconate niobate-barium titanate (PZN-BA) and $Pb_{1-x}^{2+}La_x^{3+}(Zr_yTi_z)_{1-x/4}O_3$, (PLZT). Preferred piezoelectrics include lead zirconate titanate (PZT), barium titanate (BT) and $NbLiO_3$. Preferred are lead magnesium niobates (PMN), preferably lead magnesium niobate-lead titanate (PMN-PT) as is well known in the art. Preferably the lead magnesium niobate has a Curie temperature Tm approximately equal to the operating temperature of the electro-acoustic transducer. PMN-PT materials are particularly attractive in high power projector applications because they offer figure of merit improvements of up to 11 dB compared with conventional PZT. This increase can be used to produce higher peak source levels without significant impact to system size/weight, or it can be used to achieve comparable system performance in smaller, lighter weight arrays. The term PMN-PT is used to describe a family of ceramics whose electrostrictive properties vary widely. The ratio of Lead Titanate (PT) (and other materials) to PMN affects both the material performance (dielectric, loss tangent, coupling, etc.) and the temperature at which these properties are maximized (Tm). A Tm=85° C. PMN material for the transducer is preferred. The material has excellent electrostrictive properties but also exhibits other mechanical and electrical properties which make it a more usable material than other PMN ceramics. PMN-PT compositions offer dramatically higher strain rates than PZT ceramics and thus higher acoustic source levels when used to drive a transducer. Other useful ceramic materials non-exclusively include PMNRT (Tm=25° C.), PMN-10/3 (Tm=85° C.), PMNHT (Tm=85° C.) and PZT8 (Tm=25° C.). Magnetostrictive materials include nickel alloys and rare-earth-iron alloys. A preferred magnetostrictive material is terbium-dysprosium-iron alloy known under the trade name Terfenol.

Transmitting transducers, or projectors, generally include a mechanically driven member such as a piston, shell, or cylinder and a driver. The driver is responsive to electrical energy and converts such energy into mechanical energy to drive the mechanically driven member. The driven member converts the mechanical energy into acoustic waves which propagate in the body of water. Most acoustic transducers have driver elements which use materials having either magnetostrictive or piezoelectric properties. Magnetostrictive materials change dimension in the presence of an applied magnetic field, whereas piezoelectric materials undergo mechanical deformation in the presence of an electrical field. A common piezoelectric driver is the ceramic stacked driver which is made up of individual ceramic elements which are stacked with alternating polarities. In this stacking arrangement, the ceramic stack is longitudinally polarized. Electrical drive is applied to the elements of the ceramic stack and in response, each element expands and contracts in the longitudinal direction. The individual element displacements accumulate to provide a net displacement of the stack. Pre-stress is applied to the stack by compressing the shell along its minor axis, thereby extending the major axis dimension allowing a slightly oversized ceramic stack driver to be placed along the major axis. Releasing the compressive force applied to the elliptical shell places the stack in compression. With this configuration, the elliptical shell acts as a mechanical impedance transformer between the driving element and the medium, such as a body of water, in which the transducer is disposed. In some flextensional configurations, the ceramic stack is made in two parts and the pair of ceramic drivers are separated with a support structure, having an I-beam frame disposed across the minor axis of the elliptical shell for providing a mounting surface for endplates at each end of the shell. The endplates 28 seal the transducer stack and protect the inner components from the outside medium. As used in this manner, the stack support structure provides a thermal path for dissipating heat generated in the ceramic stack driver. This heat sinking feature can be very important in high power applications. The dynamic excitation of the ceramic stack driver causes the stack to expand and contract. A small velocity imparted at the ends of the ceramic stack is converted to a much larger velocity at the major faces of the elliptical shell resulting in the generation of an acoustic field within a medium in which the transducer is disposed. It is generally desired for good electro-acoustic efficiency that contact is made to the drive points of the shell only by the ceramic stack assembly. The support structure and end plates are generally physically isolated from the shell. In this arrangement, the flextensional transducer is said to be "air-backed", that is, air is disposed in contact with the shell and the support structure.

The transducer shells may be composed of any suitable material such as steel, aluminum, fiberglass or suitable polymeric material. Wall thickness can be easily determined by those skilled in the art, however, wall thickness in the range of from about 0.25 inch to about 3 inches are useful. Each shell may have any convenient length and width, such as a height of from about 7 inches to about 4 feet and a width of from about 1.5 inches to about 2 feet.

The transducer assembly with high power density electostrictive ceramic preferably has biasing means for providing a first electrical signal to polarize the ceramic stacks. Means are also provided for applying an alternating current driving signal to each of the transducers. This generates acoustically in-phase output signals from each transducer. The AC drive signals are separately applied across each transducer. The transducers are designed to present similar electrical impedances to the drive voltage. Impedances of the two may be the same or different, however variations of as much as 30% are tolerable. In the preferred transducer assembly, the transducer pairs preferably have the same resonant frequencies.

Figure 4:
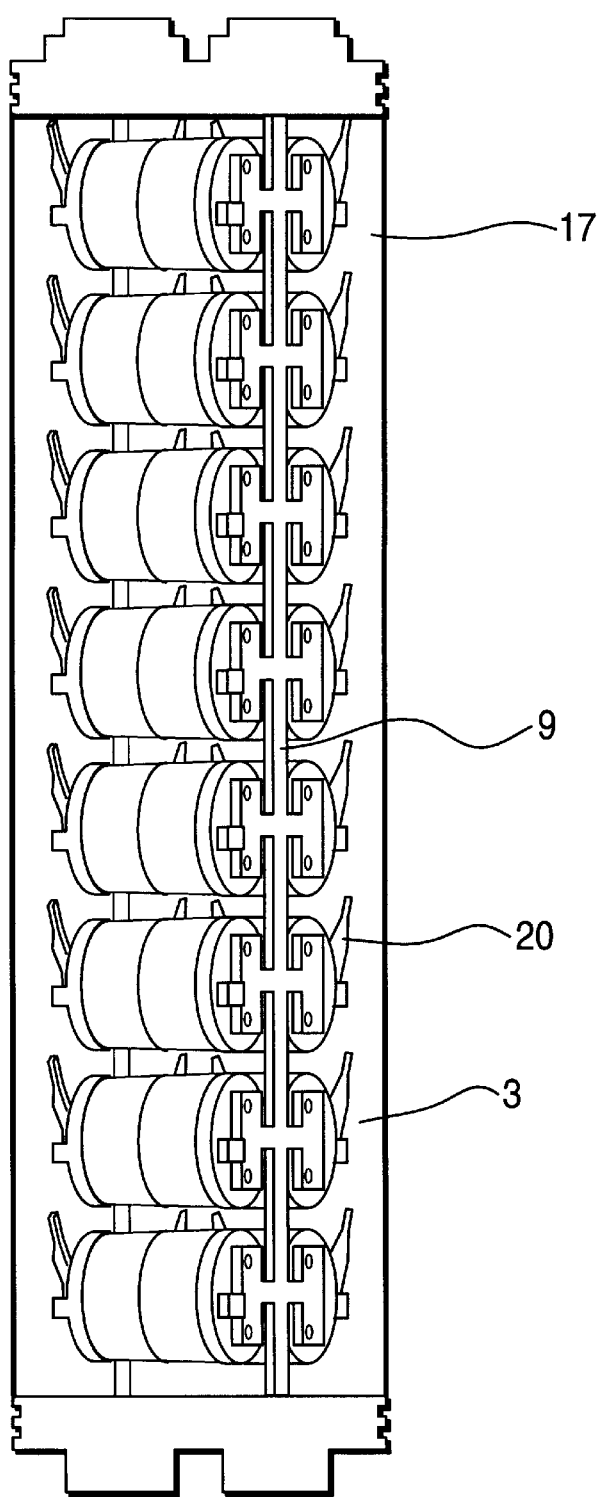
FIG. 4 is a view of the transmitting transducers in a pressure housing.

The array 3 is stacked within and confined by a generally cylindrical, acoustically transparent pressure housing 4. This pressure housing prevents cavitation during operation of the sonar assembly. The housing 4 is attached internally at opposite ends to top 16 and a bottom 18 portions of a U-shaped frame 17. This frame is mountable on a ship's hull 5, as shown. Shown in FIG. 4 is a sectional view of the pressure housing 4 showing the array of transducers 3 it encapsulates. The array of transducers 3 comprises a set of preferably substantially identical transducers 2 attached by a suitable support 9.

The housing 4 of the assembly 1 as well as support 9 may be composed either of a metal or polymeric material as could be determined by one skilled in the art. Additionally, the housing 4 is filled with a fluid such as seawater or any other fluid appropriate for purposes within the scope of this invention. It is well known in the art that operation of sonar devices can cause cavitation due to the negative pressures created by the generated sound field. These negative pressures cause the pressure of the water to drop below the vapor pressure, thereby allowing the water to vaporize. To combat this problem, the pressure housing 4 is maintained at a pressure ranging from about 40 to about 50 psi.

Referring again to FIG. 1, sequentially positioned around a periphery of the frame are a plurality of staves 6. These staves 6 extend between the first top portion 16 and a second bottom portion 18 of the frame 17. Positioned along each stave 6 is a series of pairs of acoustic receive hydrophones 8, as can be seen in FIGS. 2 and 3. The staves are long, narrow strips of metal, polymer or other material used to support the hydrophones and dual acoustic modules. The receive array may comprise from about 20 to about 80 staves, more preferably from about 30 to about 50 staves.

FIG. 3 shows a full size elevational view of a single stave 6. Typically they are from about 6 feet to about 8 feet long, however longer or shorter staves are within the contemplation of the invention. The hydrophones 8 are commonly used receivers in towed array sonar systems. Each of these hydrophones 8 are independently connected to signal detecting circuitry and are used to intercept reflected acoustic signals sent back to the sonar assembly. Typically hydrophones are designed to operate over broad frequency ranges and are generally small in size relative to the wavelength of the highest intended operating frequency. Also optionally positioned on the staves to facilitate reliable telemetry are dual acoustic modules 10 which sample received analog signals from each hydrophone or pair of hydrophones.

Surrounding the frame 17 is an acoustically transparent window or dome 12. This acoustic window 12, as seen in FIG. 1, encapsulates the frame along with the transmit and receive arrays to form an enclosed, pressurized chamber. This pressurized chamber further protects the assembly 1 from cavitation during operation of the system. The chamber formed by the acoustic window 12 is also filled with a fluid and is maintained at a pressure ranging from about 15 psi to about 25 psi. Suitable fluids include seawater or any other fluid appropriate for purposes within the scope of this invention. Such acoustically transparent domes can have any conventional shape such as ellipsoidal, circular and the like. Alternately, the dome can simply conform to a curvilinear portion of a vessel hull 5 and thereby resemble a window of a building or other structure. The particular physical form taken by such an acoustic window will be a function of the particular acoustic wave form transmission/reception function to be provided by the acoustic transmitter or receiver equipment positioned behind the dome or within an enclosure at least partially defined by the dome. The window may be formed of a suitable or conventional structural material. This material can be reinforced or unreinforced thermosetting plastic or reinforced or unreinforced thermoplastic. Alternately it can be formed from a low density, high modulus metal or metal alloy, or from carbon composites. A more thorough description of the properties of suitable acoustic window can be found in U.S. Pat. No. 4,997,705, incorporated herein by reference.

In use, an alternating current is sent from a power source on the ship to electrodes 20 on the projecting transducer elements 2. Application of this electrical signal causes the high power density ceramic elements to expand and contract in such a manner to produce a vibration along the length of each ceramic stack. This vibration is transmitted to the cylindrical housing 4 and causes a vibration along the minor axis of the shell. This vibration generates acoustic waves that are sent past the housing 4 and window 12 and into the sea water.

Once a projected acoustic wave reaches its target, it is reflected back to the sonar assembly where it is received by the receive array. The receive array is configured to allow the assembly to receive acoustic data from an expansive area in a cardioid vertical and horizontal pattern, eliminating wave reflections from the hull of the ship and from the transmitting array, thus minimizing the noise from which the assembly can receive data. The hydrophones 8 receive reflected acoustic waves as analog signals. Thereafter, the acoustic modules 10 sample the received analog signals from each hydrophone or pair of hydrophones and generating a digital signal from the analog signals. The sampled data is converted to a digital signal and transmitted inside the ship to a processor unit via fiber optic cables.

This enables the ship crew to detect and localize the target which reflected sound to the ship. The described receive array can also be used in a passive mode wherein it is not excited by the active array but receives acoustic signals emitted by submarine or other targets.

The invention also provides a process for detecting underwater objects comprising first providing the above described sonar assembly comprising, then transmitting an acoustic signal from a plurality of the transducer elements into a fluid medium, receiving a reflected acoustic signal via the acoustic receive hydrophones, sampling analog signals received by the hydrophones or hydrophone pairs via sampling means and generating a digital signal from the analog signals. A representation of that digital signal is then displayed via any suitable display means such as a cathode ray tube.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A sonar assembly comprising:
    a) an elongated array of sequentially juxtaposed transmitting transducer elements stacked within and confined by a pressure housing, each transducer being independently connected to drive circuitry;
    b) opposite ends of the pressure housing being attached internally to first and second portions of a frame, which frame is mountable on a ship;
    c) a plurality of staves sequentially positioned around a periphery of the frame, each stave extending between the first and second portions of the frame;
    d) a series of acoustic receive hydrophones positioned along each stave, each hydrophone being independently connected to signal detecting circuitry; and
    e) an acoustically transparent housing encapsulating the frame.

2. The sonar assembly of claim 1 wherein the transmitting transducer elements have a resonant frequency in the range of from about 1000 HZ to about 10000 Hz.

3. The sonar assembly of claim 1 wherein the transducer elements comprise flextensional transducers, flexural disk transducers, or slotted cylinder transducers.

4. The sonar assembly of claim 1 wherein the transducer elements comprise a stack of high power density electostrictive ceramic material.

5. The sonar assembly of claim 1 wherein the transducer elements comprise a stack of high power density magnetostrictive material.

6. The sonar assembly of claim 1 where each transducer element comprises a concave or convex flextensional transducer which comprises a hollow, elliptical shell comprising a pair of concave or convex side walls meeting at opposing ends; said walls and ends delineating opposing open sides; a high power density electostrictive ceramic stack or magnetostrictive stack positioned in the hollow elliptical shell and extending between the opposing ends and adapted to exert a force on the opposing ends and strain the concave or convex side walls when the stack is subjected to sufficient driving voltage through electrodes bonded to the stack.

7. The sonar assembly of claim 6 where each transducer element is attached to a mating transducer element by means of an intermediate elastomeric seal attached to an open side of each transducer element, the transducer elements being positioned such that the electrostrictive or magnetostrictive stack of one transducer element is parallel to the electrostrictive or magnetostrictive stack of the mating transducer element; opposite open sides of each pair of mating transducer elements being closed by an endcap thus forming a hollow ellipsoid container.

8. The sonar assembly of claim 7 wherein a plurality of the hollow ellipsoid containers are attached to each other in stacked container pairs within the pressure housing such that each of the ceramic stacks are parallel and extend in a direction between the first and second portions of the frame.

9. The sonar assembly of claim 7 wherein a plurality of the hollow ellipsoid containers are attached to each other in eight stacked container pairs within the pressure housing.

10. The sonar assembly of claim 7 wherein each transducer element is separated from its mating transducer element by a distance of about ¼ wavelength at the center of the operating frequency band of the assembly.

11. The sonar assembly of claim 7 wherein each hollow ellipsoid container of each pair is separated from its corresponding hollow ellipsoid container of each pair by a distance of about ¼ wavelength at the center of the operating frequency band of the assembly.

12. The sonar assembly of claim 8 wherein each hollow ellipsoid container of the stack is separated from an adjacent hollow ellipsoid container of the stack by a distance of about ½ wavelength at the center of the operating frequency band of the assembly.

13. The sonar assembly of claim 6 wherein the high power density ceramic stack comprises lead magnesium niobate or lead magnesium niobate-lead titanate.

14. The sonar assembly of claim 1 wherein the hydrophones are arranged in pairs along each stave.

15. The sonar assembly of claim 1 comprising means for sampling analog signals received by the hydrophones and generating a digital signal from the analog signals.

16. The sonar assembly of claim 1 comprising means for sampling analog signals from pairs of hydrophones along each stave and generating digital signals corresponding to each pair of analog signals.

17. The sonar assembly of claim 1 wherein the transmitting flextensional transducers are substantially identical.

18. The sonar assembly of claim 1 wherein the pressure housing comprises a cylinder.

19. The sonar assembly of claim 1 wherein the pressure housing is pressurized internally at from about 40 psi to about 50 psi.

20. The sonar assembly of claim 1 wherein the pressure housing is filled with a fluid.

21. The sonar assembly of claim 1 wherein the acoustically transparent housing is pressurized internally at about 15 psi to about 25 psi.

22. A bow dome sonar assembly for connection to the bow of a ship comprising:
    a) an elongated array of sequentially juxtaposed transmitting transducer elements stacked within and confined by a pressure housing, each transducer being independently connected to drive circuitry;
    b) opposite ends of the pressure housing being attached internally to first and second portions of a frame, which frame is mountable on a ship;
    c) a plurality of staves sequentially positioned around a periphery of the frame, each stave extending between the first and second portions of the frame;
    d) a series of acoustic receive hydrophones positioned along each stave, each hydrophone being independently connected to signal detecting circuitry; and
    e) an acoustically transparent housing encapsulating the frame.

23. The sonar assembly of claim 22 wherein the high power density ceramic stack comprises lead magnesium niobate or lead magnesium niobate-lead titanate.

24. A process for detecting underwater objects comprising:
   a) providing a sonar assembly comprising:
      i) an elongated array of sequentially juxtaposed transmitting transducer elements stacked within and confined by a pressure housing, each transducer being independently connected to drive circuitry;
      ii) opposite ends of the pressure housing being attached internally to first and second portions of a frame, which frame is mountable on a ship;
      iii) a plurality of staves sequentially positioned around a periphery of the frame, each stave extending between the first and second portions of the frame;
      iv) a series of acoustic receive hydrophones positioned along each stave, each hydrophone being independently connected to signal detecting circuitry; and
      v) an acoustically transparent housing encapsulating the frame;
   b) transmitting an acoustic signal from a plurality of transmitting transducer elements into a fluid medium;
   c) receiving a reflected acoustic signal via the acoustic receive hydrophones;
   d) sampling analog signals received by the hydrophones via sampling means; and
   e) generating a digital signal from the analog signals.

25. The process of claim 24 further comprising displaying a representation of the digital signal via a display.

26. The process for detecting underwater objects of claim 24 wherein analog signals received from pairs of hydrophones are sampled and digital signals are generated corresponding to each pair of analog signals.

* * * * *